(12) United States Patent
Benson et al.

(10) Patent No.: US 7,465,163 B2
(45) Date of Patent: Dec. 16, 2008

(54) SMOOTH COMPLIANT BELT FOR USE WITH MOLDING ROLLER

(75) Inventors: John E. Benson, Webster, NY (US); Robert P. Bourdelais, Pittsford, NY (US); Cheryl J. Brickey, Webster, NY (US)

(73) Assignee: Rohm and Haas Denmark Finance A/S, Copenhagen (DK)

( * ) Notice: Subject to any disclaimer, the term of this patent is extended or adjusted under 35 U.S.C. 154(b) by 934 days.

(21) Appl. No.: 10/868,084

(22) Filed: Jun. 15, 2004

(65) Prior Publication Data

US 2005/0275122 A1 Dec. 15, 2005

(51) Int. Cl.
*B29C 43/48* (2006.01)
*B29C 59/04* (2006.01)

(52) U.S. Cl. ................. 425/471; 425/363; 425/373

(58) Field of Classification Search ............. 425/363, 425/373, 471
See application file for complete search history.

(56) References Cited

U.S. PATENT DOCUMENTS

| | | | |
|---|---|---|---|
| 3,258,812 A * | 7/1966 | Willy | 425/471 |
| 4,193,959 A | 3/1980 | Lemelson | |
| 4,211,743 A | 7/1980 | Nauta et al. | |
| 4,269,585 A * | 5/1981 | Gersbeck et al. | 425/373 |
| 4,290,248 A | 9/1981 | Kemerer et al. | |
| 5,658,514 A * | 8/1997 | Fujii et al. | 425/327 |
| 5,674,442 A | 10/1997 | Morita | |
| 5,958,309 A | 9/1999 | Fujii et al. | |
| 6,024,907 A * | 2/2000 | Jagunich | 425/373 |
| 2002/0190418 A1 | 12/2002 | Jens et al. | |
| 2004/0122155 A1* | 6/2004 | Pazur | 524/445 |

FOREIGN PATENT DOCUMENTS

| | | |
|---|---|---|
| EP | 0 799 686 | 10/1997 |
| EP | 0 836 927 | 4/1998 |
| GB | 650 216 | 2/1951 |
| WO | 99/12722 | 3/1999 |

\* cited by examiner

*Primary Examiner*—James Mackey
(74) *Attorney, Agent, or Firm*—Edwin Oh

(57) ABSTRACT

The invention relates to an apparatus and method of making a solid film. Viscous material (163) is input into a nip between a patterned roller (165) and a belt (167). The nip between the patterned roller (165) and belt (167) is facilitated by a compliant roller (169). Accordingly, a film may be produced that has discrete optical elements and a smooth backside.

11 Claims, 13 Drawing Sheets

SMOOTH COMPLIANT BELT FOR USE WITH MOLDING ROLLER

CROSS REFERENCE TO RELATED APPLICATIONS

The present application is related to U.S. patent application Ser. No. 10/868,688 which is incorporated by reference in entirety.

FIELD OF THE INVENTION

Example embodiments of the present invention relate to a method of manufacturing a thermoplastic film having optical elements on one side of the film and a smooth surface on another side of the film.

BACKGROUND OF THE INVENTION

Films with patterned surfaces are made for a variety of applications. For example, photographic paper may include a film with a matte or glossy finish. This matte finish or glossy finish may produce a desirable effect on a photograph when viewed by a casual observer. A glossy or matte finish requires a photographic paper manufacturing process with certain tolerances (i.e. a certain level of precision). As tolerances of a manufacturing process become tighter, the manufacturing process generally becomes more complicated and expensive. In other words, the tolerances required to produce a patterned film for photographic paper may be significantly lower than the tolerances required to manufacture a light management film for a liquid crystal display.

A light management film may be used in a variety of applications. For example, a light directing film may be used as part of a liquid crystal display (LCD) to increase the power efficiency of the LCD. Increasing the power efficiency of a LCD (or other similar display) may be significant. Liquid crystal displays are often included in mobile devices (e.g. cellular telephones, laptop computers, digital cameras, etc.) which run on batteries. It is desirable for these mobile devices to maximize the operating time of their batteries. Although battery technology is improving, one way to increase the battery life of a mobile device is to reduce power consumption of the device without degrading quality. By making liquid crystal displays more efficient, the battery life of a mobile device can be extended, which is of great benefit to the user.

The optics of a light management film are very specific and detailed, compared to the optics of a glossy or matte finish on photographs. Accordingly, the precision of the manufacturing process for producing glossy or matte finishes on photographic paper may be inadequate for purposes of manufacturing light management films. For example, the manufacturing process used to manufacture other patterned films may not adequately reproduce optical elements of a light management film or provide a uniform thickness of the film, which may be required for a light management film to be usable. These inadequacies of previous manufacturing processes are critical considerations to the manufacturing of light management films.

SUMMARY OF THE INVENTION

Example embodiments of the present invention relate to an apparatus including a rigid surface and a compliant surface. The rigid surface includes an optical element molding pattern. The compliant surface and the rigid surface form a nip and the nip is configured to form a solid film from a viscous material inserted into the nip.

Other example embodiments relate to a compliant pressure belt including an endless belt. The endless belt includes at least one elastomeric layer and least one metal layer. The outside surface of the belt has a roughness average of less than 50 nanometers and a hardness between 90 Shore A and 50 Shore D.

Other example embodiments relate to a process of forming a patterned sheet. The process includes providing a melt curtain of thermoplastic polymer and bringing the curtain into a molding nip between a molding roller and compliant pressure belt. The compliant pressure belt includes an endless belt. The endless belt includes at least one elastomeric layer. The outside surface of the belt has a roughness average less than 50 nanometers and a hardness between 90 Shore A and 50 Shore D.

Other example embodiments relate to a process of forming a patterned sheet. The process includes providing a melt curtain of thermoplastic polymer and bringing the curtain into a molding nip between a molding roller and pressure belts. The pressure belts include a contact belt in contact with the melt curtain and cushioning belt in contact with the metal belt on the opposite side from the melt curtain. The cushioning belt has a hardness between 90 Shore A and 50 Shore D.

In accordance with example embodiments of the present invention, the manufacturing process is able to produce light management films that can be used in a variety of applications. For example, by using the manufacturing process in accordance with example embodiments of the invention, the light management film can be produced with an accurate replication of specific optical elements. This replication of the specific optical elements allows for a film that can create a substantial increase in efficiency of a liquid crystal display. Accordingly, this increase in efficiency can extend the battery life of a mobile device (e.g. a cellular phone, laptop computer, digital camera, etc.) A manufacturing process of example embodiments will allow for a thin film to be produced with discreet optical element, having a uniform thickness. A light management film without the discreet optical elements and uniform thickness will not be effective in increasing the efficiency of a display device, without degrading the display quality.

DETAILED DESCRIPTION OF THE INVENTION

Figure 1:
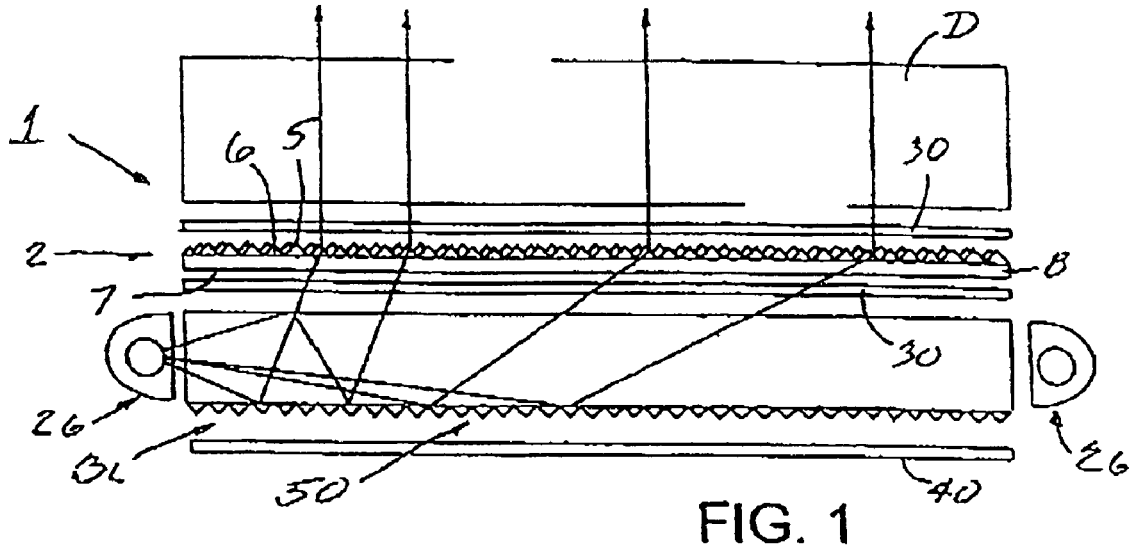
FIG. 1 is a schematic side elevation view of a light management film system, in accordance with example embodiments of the present invention.
Figure 2:
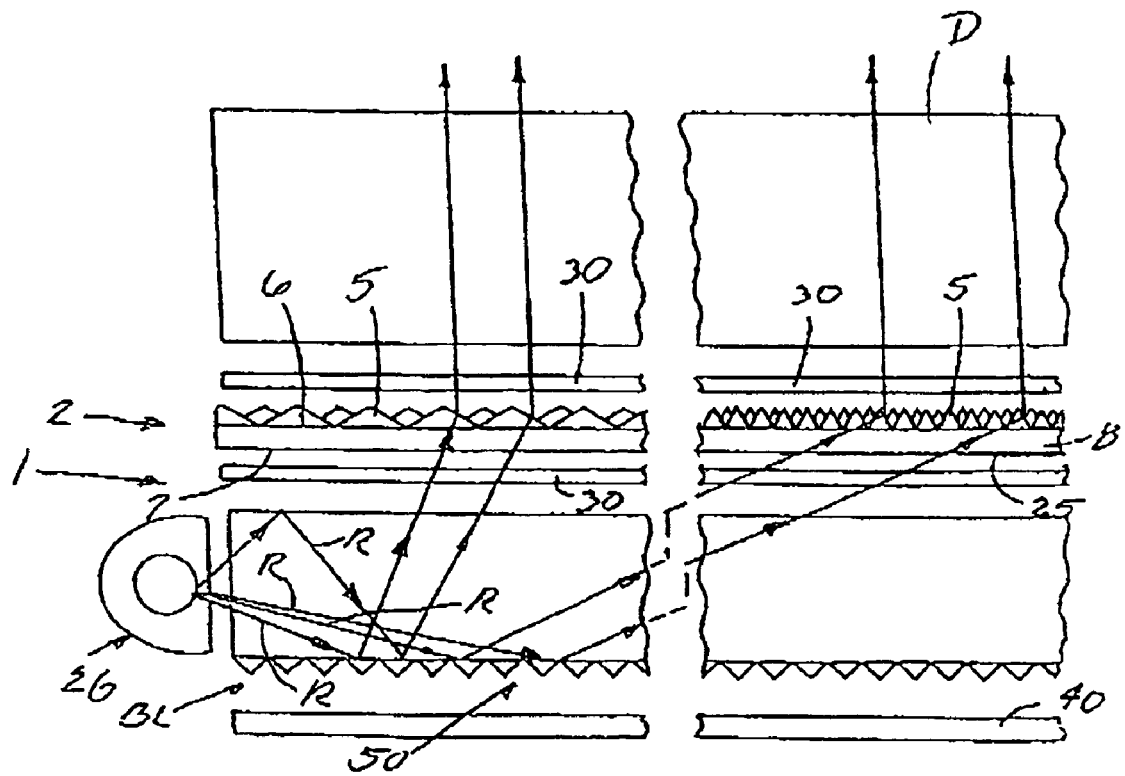
FIG. 2 is an enlarged fragmentary side elevation view of a portion of a backlight and a light management film system, in accordance with example embodiments of the present invention.

Example FIGS. 1 and 2 schematically show one form of light management film system 1 in accordance with example embodiments of the present invention. Light management film system 1 may include a light management film 2 that redistributes more of the light emitted by a backlight BL (or other light source) toward a direction more normal to the surface of the film. Film 2 may be used to redistribute light within a desired viewing angle from almost any light source for lighting applications. For example, film 2 may be used with a display D (e.g. in a liquid crystal display, used in laptop computers, word processors, avionic displays, cell phones, and PDAs) to make the displays brighter. A liquid crystal display can be any type, including a transmissive liquid crystal display as schematically shown in example FIGS. 1 and 2, a reflective liquid crystal display as schematically shown in example FIG. 3, or a transflective liquid crystal display as schematically shown in example FIG. 4. In example embodiments, a management optical film provides an optical on gain (output/input) greater than 1.0.

Figure 3:
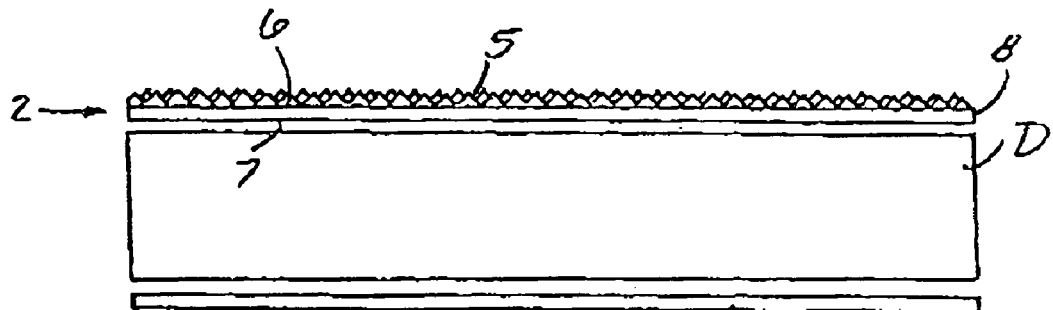
FIGS. 3 and 4 are schematic side elevation views of light management film systems, in accordance with example embodiments of the present invention.

The reflective liquid crystal display D shown in example FIG. 3 may include a back reflector 40 adjacent the back side for reflecting ambient light entering the display back out of the display to increase the brightness of the display. The light management film 2 in accordance with example embodiments of the present invention may be placed adjacent to the top of the reflective liquid crystal display to redirect ambient light (or light from a front light) into the display toward a direction more normal to the plane of the film for reflection back out by the back reflector within a desired viewing angle to increase the brightness of the display. Light management film 2 may be attached to, laminated to or otherwise held in place against the top of the liquid crystal display.

Figure 4:
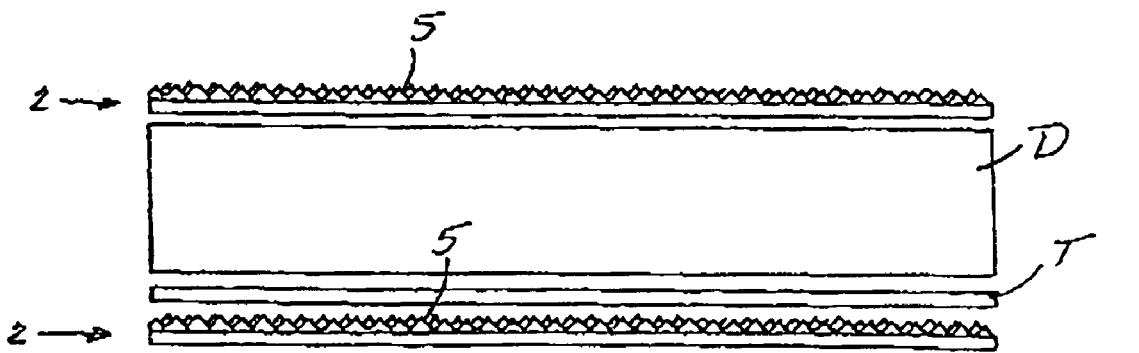

The transflective liquid crystal display D shown in example FIG. 4 includes a transreflector T placed between the display and a backlight BL for reflecting ambient light entering the front of the display back out the display to increase the brightness of the display in a lighted environment, and for transmitting light from the backlight through the transreflector and out the display to illuminate the display in a dark environment. In this example embodiment, the light management film 2 may either be placed adjacent the top of the display or adjacent the bottom of the display or both as schematically shown in example FIG. 4 for management or redistributing ambient light and/or light from the backlight more normal to the plane of the film to make the light ray output distribution more acceptable to travel through the display to increase the brightness of the display.

Figure 5:
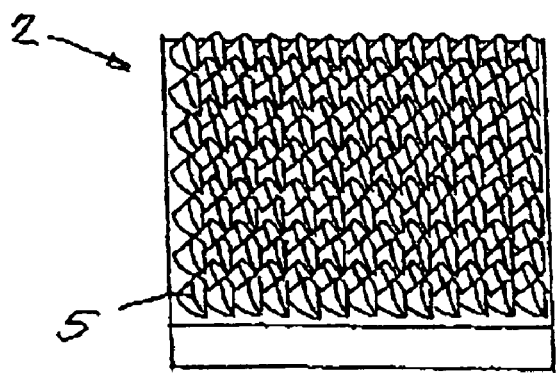
FIG. 5 is a schematic view showing optical elements on light management films, in accordance with example embodiments of the present invention.

Light management film 2 may include a thin transparent film or substrate 8 having a pattern of discrete individual optical elements 5 of well defined shape on the light exit surface 6 of the film for refracting the incident light distribution such that the distribution of the light exiting the film is in a direction more normal to the surface of the film. FIG. 5 is an example illustration of light management film 2. In example embodiments of the present invention, individual optical elements are elements of a well defined shape that can be projections or depressions in an optical film. Individual optical elements may be small relative to the length and width of an optical film. A curved surface may be part of an individual element that has curvature in at least one plane. A wedge shaped element may be an element that includes one or more sloping surfaces, and these surfaces may be combination of planar and curved surfaces.

In example embodiments, the individual optical elements have one curved surface and one planar surface. The curved surface may have curvature in one, two, or three axes and serves to collimate the light in more than one direction. Where the two surfaces meet is the ridge. The ridge is the linear apex formed where the sides of the element meet. Elements may have a curvature in the plane of the film such that the elements can collimate in more than one direction.

Each of the individual optical elements 5 may have a width and length many times smaller than the width and length of the film, and may be formed by depressions in or projections on the exit surface of the film. These individual optical elements 5 may include at least one sloping surface for refracting the incident light toward the direction normal to the light exit surface. Optical elements 5 may have an aspect ratio (height to width) greater than 0.4. The individual optical elements of the invention may be randomly placed and parallel to each other. This arrangement may cause the ridges to be generally aligned in the same direction. In example embodiments, generally oriented ridgelines may be advantageous so that the film collimates more in one direction than the other which creates higher on-axis gain when used in a liquid crystal backlighting system.

The elements may have a cross section indicating a 90 degree included angle at the highest point of the element. A 90 degree ridge angle may produce the highest on-axis brightness for the light management film. However, a 90 degree angle is not absolutely necessary. For example, an angle of 88 to 92 degrees may produces similar results. When the angle of the ridge is less than 85 degrees or more than 95 degrees, the on-axis brightness for the light management film may decrease.

Example FIG. 5 shows one pattern of individual optical elements 5 on film 2. These optical elements may take many different shapes. U.S. Patent Application Publication No. US 2001/0053075 A1 titled "Light Management Films and Film Systems" is hereby incorporated by reference in entirety. This application illustrates many variations of optical elements. However, one of ordinary skill in the art would appreciate other variations of optical elements of light management systems that are covered by embodiments of the present invention.

As illustrated in example FIG. 2, light entrance surface 7 of the film 2 may have an optical coating 25 (e.g. an antireflective coating, a reflective polarizer, a retardation coating or a polarizer). Also, in example embodiments, a matte or diffuse texture may be provided on the light entrance surface 7 depending on the visual appearance desired. A matte finish may produce a softer image, that does not have as high on-axis gain. The combination of planar and curved surfaces of the individual optical elements 5 of example embodiments of the present invention may be configured to redirect some of the light rays impinging thereon in different directions to produce a softer image without the need for an additional diffuser or matte finish on the entrance surface of the film. The individual optical elements 5 of the light management film 2 may also overlap each other in a staggered, interlocked and/or intersecting configuration, creating an optical structure with adequate surface area coverage.

The backlight BL may be substantially flat or curved. The backlight BL may be a single layer or multi-layers and may have different thicknesses and shapes. The backlight BL may be flexible or rigid and be made of a variety of compounds. Further, the backlight may be hollow, filled with liquid, air, or be solid, and may have holes or ridges.

The light source 26 may be of any suitable type (e.g. an arc lamp, an incandescent bulb which may also be colored, filtered or painted, a lens end bulb, a line light, a halogen lamp, a light emitting diode (LED), a chip from a LED, a neon bulb, a cold cathode fluorescent lamp, a fiber optic light pipe transmitting from a remote source, a laser or laser diode, or any other suitable light source). Additionally, the light source 26 may be a multiple colored LED, or a combination of multiple colored radiation sources in order to provide a desired colored or white light output distribution. For example, a plurality of colored lights such as LEDs of different colors (e.g., red, blue, green) or a single LED with multiple color chips may be employed to create white light or any other colored light output distribution by varying the intensities of each individual colored light.

A back reflector 40 may be attached or positioned against one side of the backlight BL as schematically shown in example FIGS. 1 and 2 in order to improve light output efficiency of the backlight by reflecting the light emitted from that side back through the backlight for emission through the opposite side. Additionally, a pattern of optical deformities 50 may be provided on one or both sides of the backlight as schematically shown in example FIGS. 1 and 2 in order to change the path of the light so that the internal critical angle is exceeded and a portion of the light is emitted from one or both sides of the backlight.

Thermoplastic films with textured surfaces have applications ranging from packaging to optical films. The texture may be produced in a casting nip that consists of a pressure roller and a patterned roller. Depending on the pattern being transferred to the thermoplastic film, it can be difficult to obtain a uniform degree of replication across the width of the film. It can also be difficult to obtain this uniform degree of replication and have a smooth backside to the film.

Rubber pressure rollers may be used to provide a relatively uniform pressure across the casting nip, since their coverings can deform to accommodate any thickness non-uniformities in a melt curtain. These thickness non-uniformities may be due to the presence of thick edges from neck-in or from other causes of non-uniform flow from the extrusion die. However, the rubber coverings may not have a surface with low enough roughness to produce a glossy (e.g. smooth) backside surface.

Figure 6:
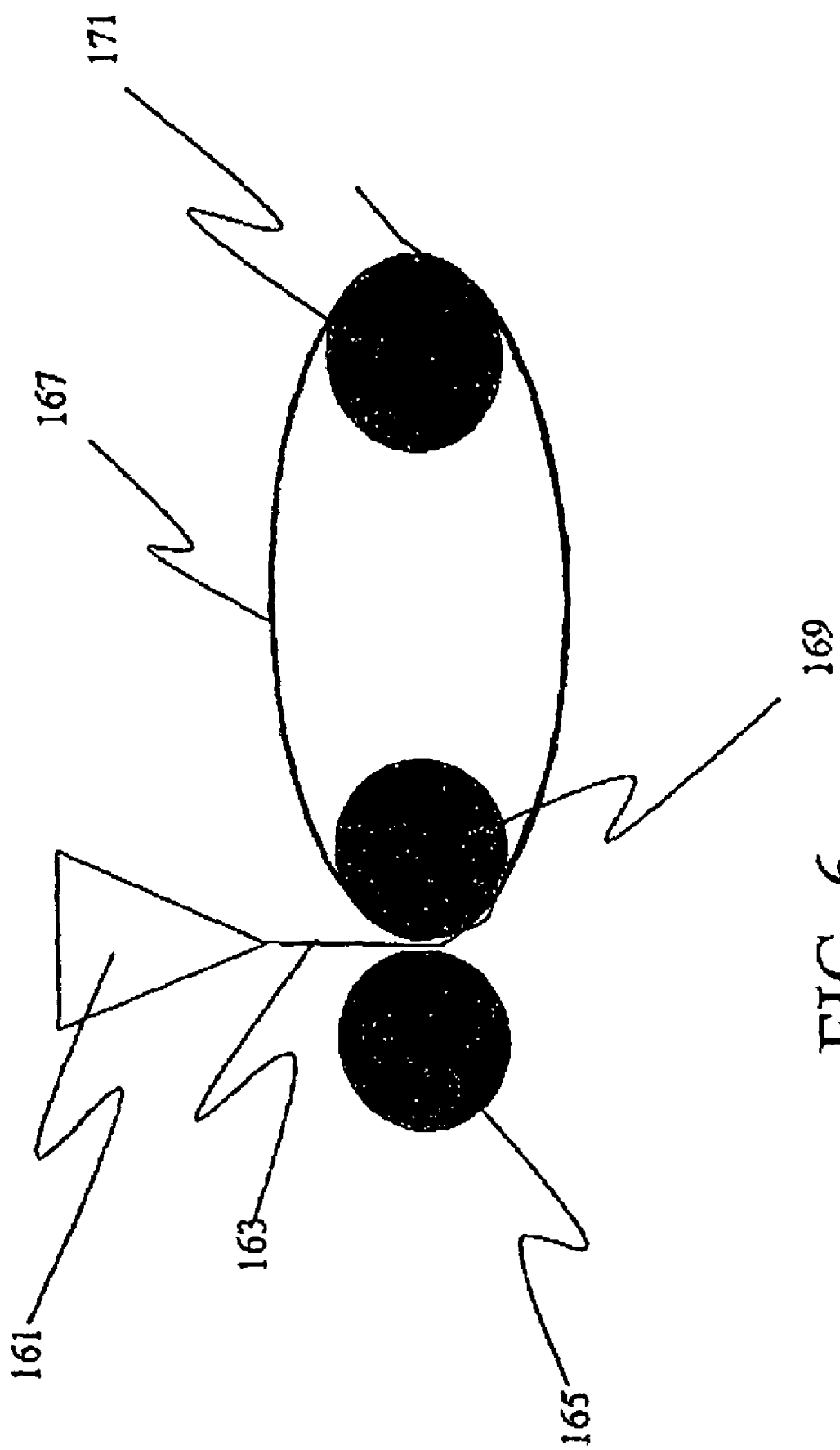
FIG. 6 shows a schematic of an extrusion roll molding system with a compliant belt system, in accordance with example embodiments of the present invention.

Example FIG. 6 is a schematic view of an extrusion roll molding system with a complying belt system, in accordance with example embodiments of the present invention. A T die or a coat hanger die may be used to melt extrude from a slit die. Extrusion die 161 maintains and/or converts material (e.g. a polymer, polycarbonate, etc.) in a viscous state. The viscous material 163 (e.g. molten polymer) is input into a nip between pattern roller 165 and belt 167. The viscous material may be a thermoplastic polymer. The viscous material may have a viscosity between 10 Pa·S and 100 Pa·S just prior to entering the nip. The dwell time of the viscous material (as it coverts into a solid) may be between 20 and 40 milliseconds. The nip pressure may be between $1.4 \times 10^8$ dyne/cm and $2.63 \times 10^8$ dyne/cm. The material may have a glass transition temperature less than 200° C. However, when the material exits the nip, it needs to be in a solid state. In example embodiments, the temperature gradient between a point immediately prior to the nip and immediately after the belt exits the nip is at least 148.88° C. The belt 167 is reinforced by belt roller 169. Belt roller 171 is also used to maintain adequate tension in belt 167.

The individual optical elements may comprise polycarbonate. Polycarbonates are available in grades for different applications and some are formulated for high temperature resistance, excellent dimensional stability, increased environmental stability, and lower melt viscosities.

In example embodiments, pattern roller 165 includes a pattern for replicating specific optical elements on an optical film which is output from the nip. In example embodiments, the pattern roller 165 is rigid and the pattern on the pattern roller 165 is precise. Belt 167 is relatively compliant compared to pattern roller 165. However, while the belt 167 is compliant when exerting pressure on the nip, it also has sufficient hardness and smoothness to produce a flat surface on one side of the solid film output from the nip. In example embodiments, the belt 167 has a hardness between 90 Shore A and 50 Shore D durometers. The film output from the nip may ride along belt 167 for some time after transferring into a solid state (or quasi-solid state). In example embodiments, the belt 167 comprises metal and elastomeric material and roller 169 can be metal or an elastomeric material. Alternatively, one of ordinary skill in the art would appreciate other materials that can be used for belt 167 and belt roller 169, such that the compliant portion of the belt produces a film with a uniform thickness and an adequately smooth surface on one side, while the other side of the film has an adequately replicated pattern from pattern roller 165.

Belt 167 may be a continuous metal belt designed to produce a smooth finish from one side of the film output from the nip. In example embodiments, the outside surface of belt 167 has a roughness average less than 50 nanometers. In other example embodiments, belt 167 has a roughness between 15 and 30 nanometers. Belt 167 may have a hardness between 90 Shore A and 50 Shore D. In some example embodiments, belt 167 is made of a combination of metal and elastomeric material. The metal layer may be the outer most layer of the belt system and is in contact with the extruded polymer. The metal layer can be polished to low roughness and has release characteristics that allow for the release of the formed sheet. In another example embodiment, a metal layer can placed on the inside of the belt. Metal on the inside of the belt provides a means for accurate driving of the belt system. Belt 167 may a circumference between 0.75 and 10 meters and may have a width between 0.5 and 2 meters. The elastomeric material may be, in example embodiments, on the outside of the belt. In example embodiments, the belt is provided with a release agent which allows the output film to easily detach from the belt after exiting the nip. The elastomeric material may include between 1 and 10 percentage by weight of a polymer having a surface energy between 22 and 35 dynes per square centimeter that has been shown to have good release of the extruded polymer.

In example embodiments of the present invention, belt 167 may be provided with heat prior to entering the nip. Use of heating the belt may help reduce the land area (discussed further below) of optical elements formed on a light management film. Further, as the film exits that nip, because the belt 167 is heated, the light management film may temporarily remain attached to the belt. This facilitates their control of the manufacturing process. One of ordinary skill in the art would appreciate that the heat provided to belt 167 may be accomplished by many different methods. For example, the heat may be provided to the belt by conduction or induction. In example embodiments, the belt is only in contact with the material at the nip. In example embodiments, belt 167 is a higher temperature at the nip than patterned roller 169.

Figure 7:
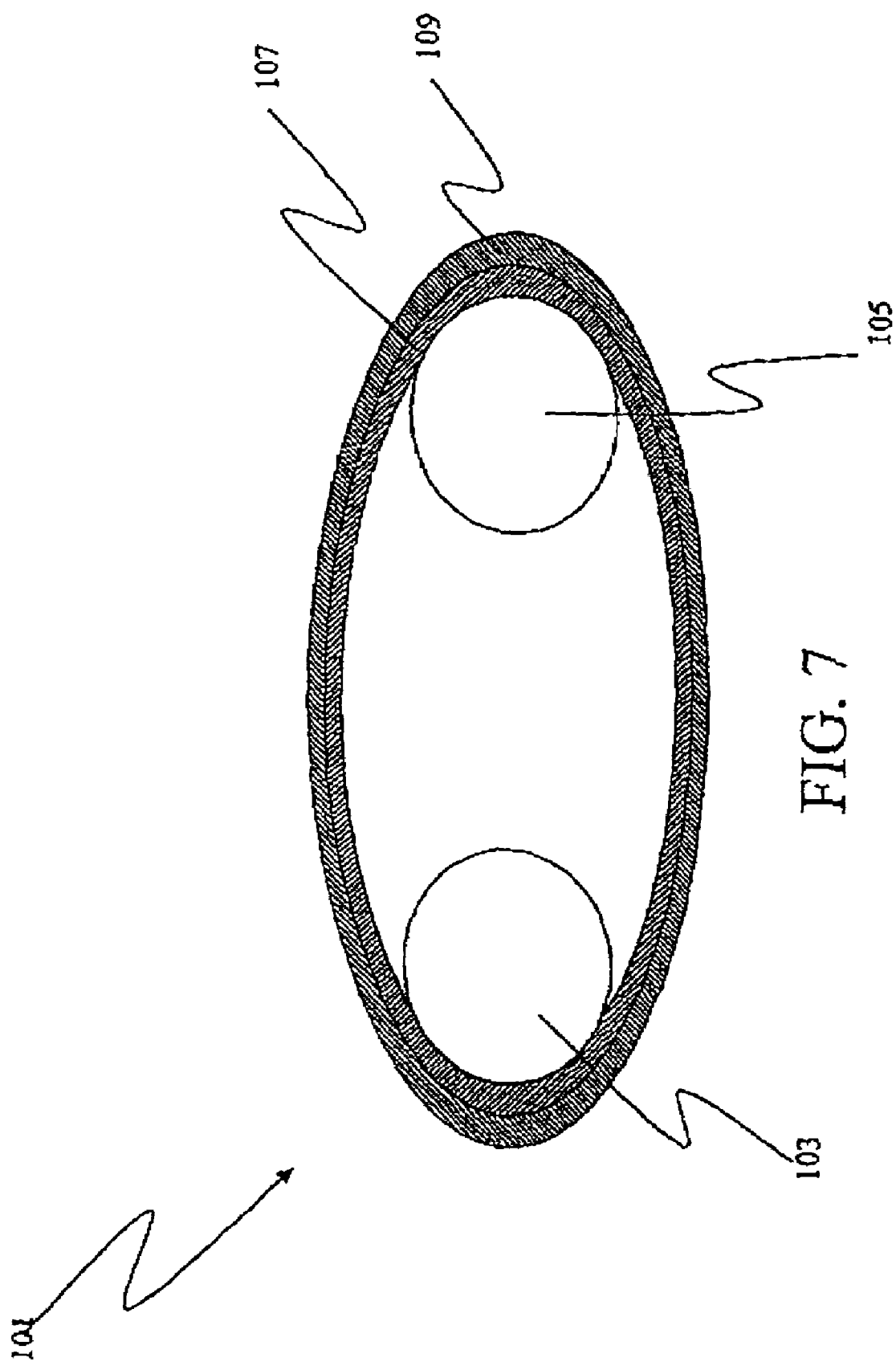
FIG. 7 is a schematic view of a belt system with a metal layer and an elastomeric layer, in accordance with example embodiments of the present invention.

Example FIG. 7 illustrates a belt system with belt roller 103 and belt roller 105 guiding a metal belt having elastomeric layer 107 and metal layer 109. The combination of elastomeric layer 107 and metal layer 109 may be advantageous for maintaining compliancy in the nip and/or providing a smooth hard surface on one side of a film. The compliancy of the belt may provide even replication across the nip and high replication and the smoothness of the belt provides a smooth backside to the light management film.

Figure 8:
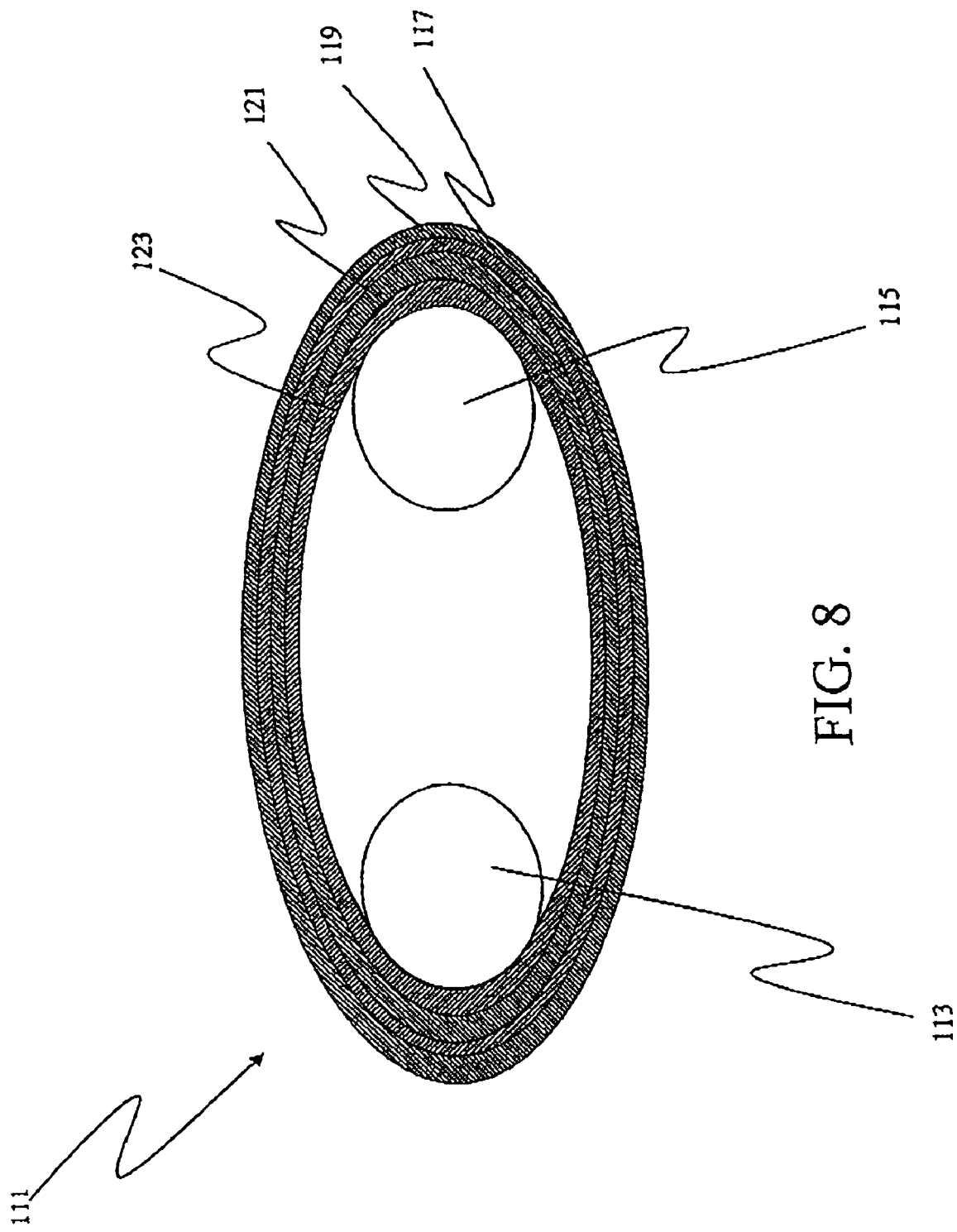
FIG. 8 is a schematic view of a belt system with an outer layer of metal, two elastomeric layers, and an inner metal layer, in accordance with example embodiments of the present invention.

Example FIG. 8 is another example embodiment of belt system 111, which has two metal layers and two elastic layers. Belt roller 113 and belt roller 115 maintain a belt with outer metal layer 117, outer elastomeric layer 119, inner elastomeric layer 121, and inner metal layer 123. In example embodiments, outer elastomeric layer 119 and inner elastomeric layer 121 have different hardnesses. In some example embodiments, outer elastomeric layer 119 has a greater hardness than inner elastomeric layer 121, while in other example embodiments, inner elastomeric layer 121 has a greater hardness than outer elastomeric layer 119. Having two or more layers of compliant elastomeric layers (dual durometer) in the belt allows for different compliancy levels that may be tailored to the product and desired pressure profile in the nip.

Figure 9:
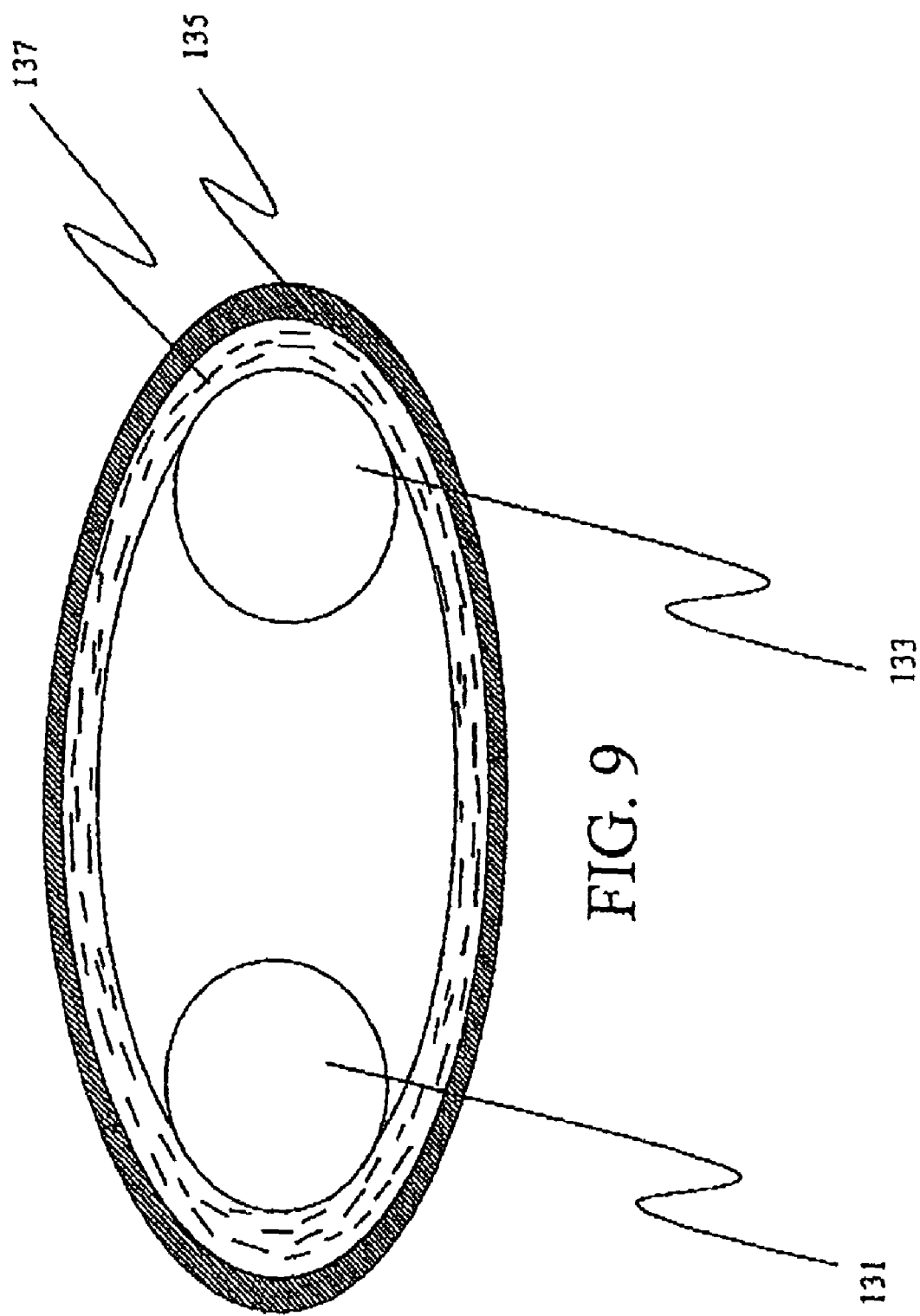
FIG. 9 is a schematic view of a belt system with a metal layer and a elastomeric layer where the elastomeric layer has reinforcing fibers substantially oriented in one direction, in accordance with example embodiments of the present invention.

In example embodiments illustrated in example FIG. 9, a belt may include an inner elastomeric layer 137 including reinforcing fibers substantially oriented in one direction. The elastomeric layer 137, as illustrated in FIG. 9, has metal layer 137 disposed on the outside. The reinforcing fibers may enhance compliancy and longevity of the belt, while maintaining a smooth hard surface of metal layer 135. In example embodiments, an elastomeric layer may include nanoclay particles between 0.2 and 5 weight percentage. The addition of nanoclay into the elastomeric layer may improve the mechanical properties of the elastomeric layer providing a 5 to 20% improvement in the mechanical resistance to bending and compression forces. The nanoclay reinforces the binder network in the elastomeric layer providing bending and compression resistance. The nanoclay also may improve the heat resistance of the elastomeric layer allowing the elastomeric layer to better withstand the heat of the extrusion process.

Figure 10:
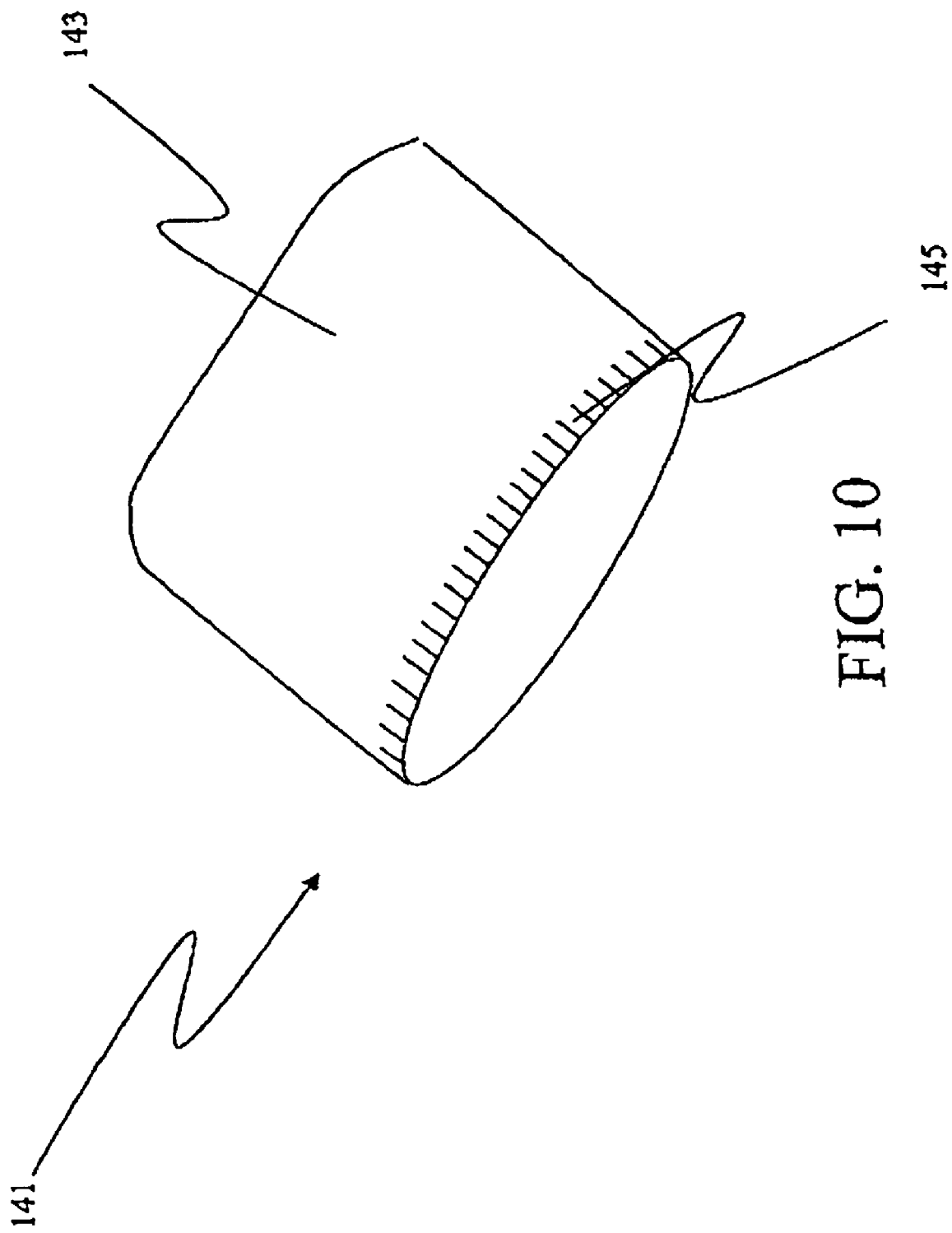
FIG. 10 is a schematic view of a belt system with timing protuberances, in accordance with example embodiments of the present invention.

In example embodiments, as illustrated in example FIG. 10, belt system 141 may include timing protuberances 145 on the belt 143. The timing protuberances 145 may assist the manufacturing machinery in calibrating the movement of a roller in belt 143 at the nip. One of ordinary skill in the art would appreciate that the timing protuberances 145 may be disposed either on the inside or the outside of belt 143.

Figure 11:
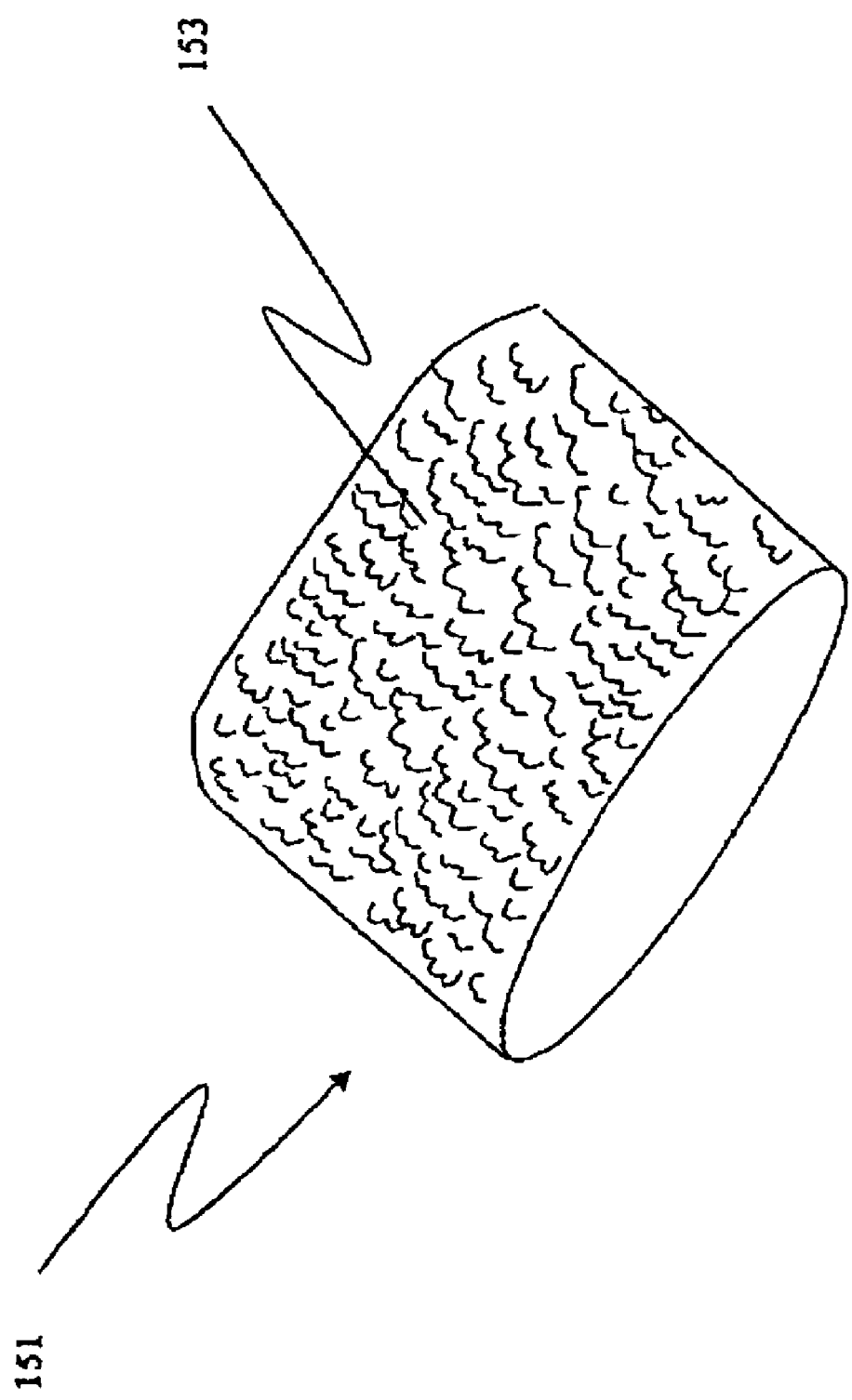
FIG. 11 is a schematic view of a belt system with a three-dimensional pattern on the outer metal layer, in accordance with example embodiments of the present invention.

In example embodiments illustrated in example FIG. 11, belt 151 may include a three-dimensional pattern 153. The three-dimensional pattern may be an optical diffusion layer for the output optical film. In applications, such as light management film for displays, the optical diffusion layer may serve to increase the viewing angle of the LCD. Increasing the optical viewing layer is a desirable feature in many products, such as LCD TVs.

Figure 12:
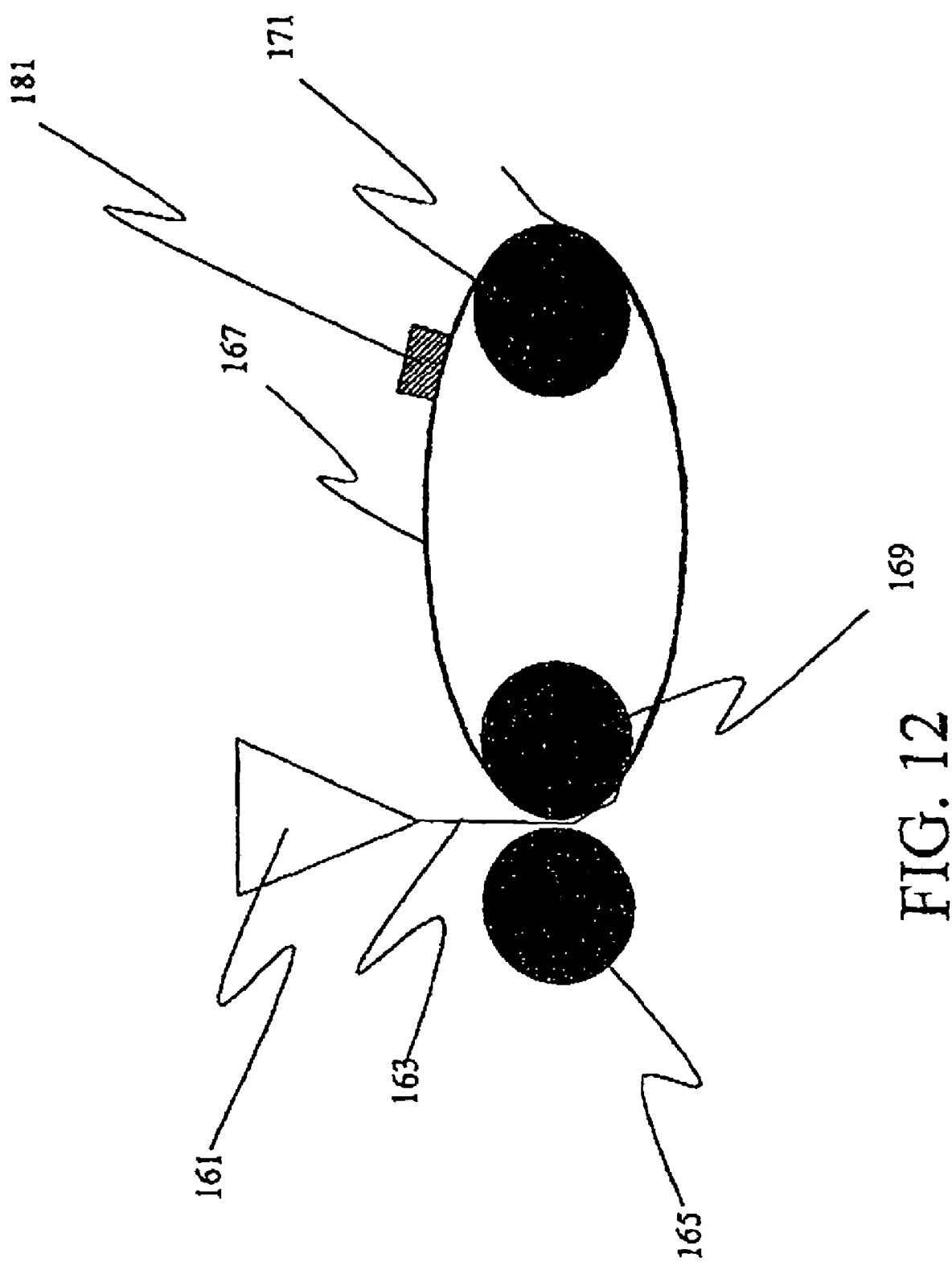
FIG. 12 is a schematic view of an extrusion roll molding system with a compliant belt system and a reciprocating soft lint-free woven cleaner, in accordance with example embodiments of the present invention.
Figure 13:
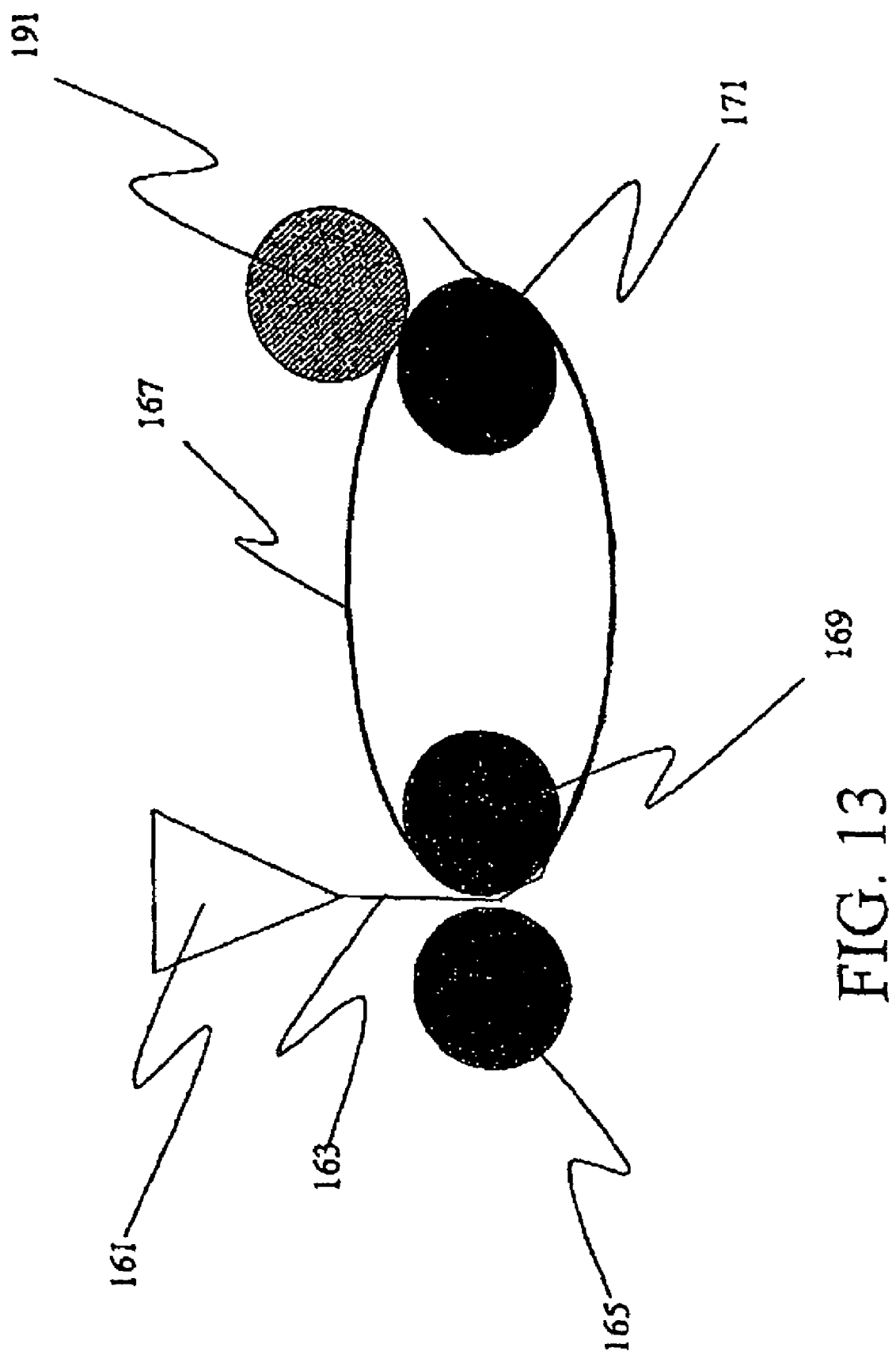
FIG. 13 is a schematic view of an extrusion roll molding system with a compliant belt system and a polishing roll, in accordance with example embodiments of the present invention.

Example FIG. 12 is similar to example FIG. 6. However, in example FIG. 12 a reciprocating soft lint-free woven cleaner 181 is disposed on a surface belt 167. The cleaner may provide a mechanism for cleaning the belt prior to the belt entering the nip. In the example embodiments illustrated in example FIG. 13, a polishing roller 191 is included. The polishing roller 191 forms a nip between belt 167. Polishing roller 191 may facilitate polishing of belt 167 so that an adequately smooth surface can be formed on a film output from the nip between pattern roller 165 and belt 167.

Figure 14:
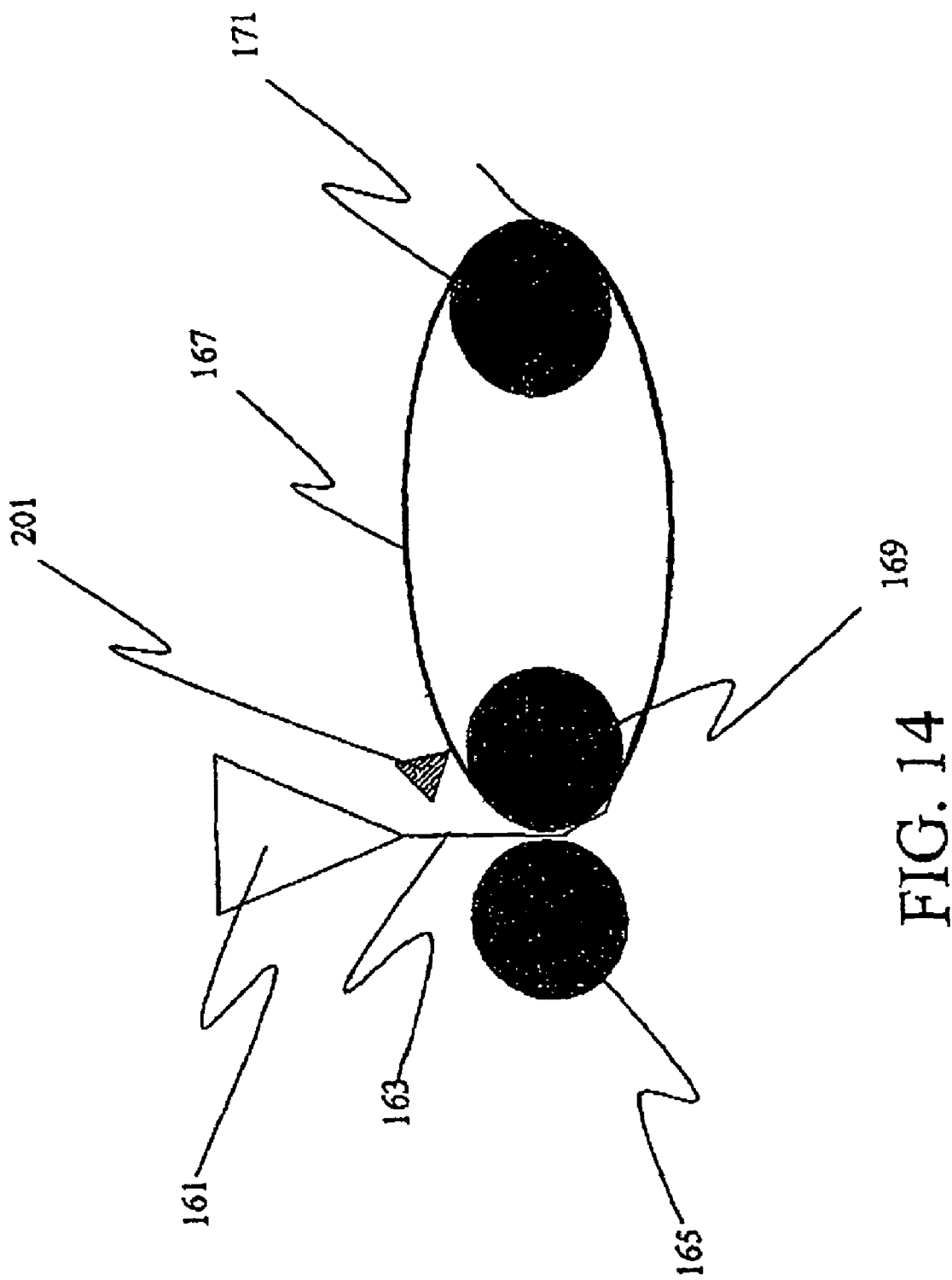
FIG. 14 is a schematic view of an extrusion roll molding system with a compliant belt system and an electrostatic discharge system, in accordance with example embodiments of the present invention.

As illustrated in the example embodiments of example FIG. 14, an electrostatic discharge system can be disposed close to the belt 167. The electrostatic discharge system 201 removes electric charge of the belt prior to the belt entering the nip. The discharge of electrostatic will increase the quality of the film output from the system, which may have desirable effects. Such electrostatic discharge may be produced as described in U.S. Pat. No. 5,494,619.

Figure 15:
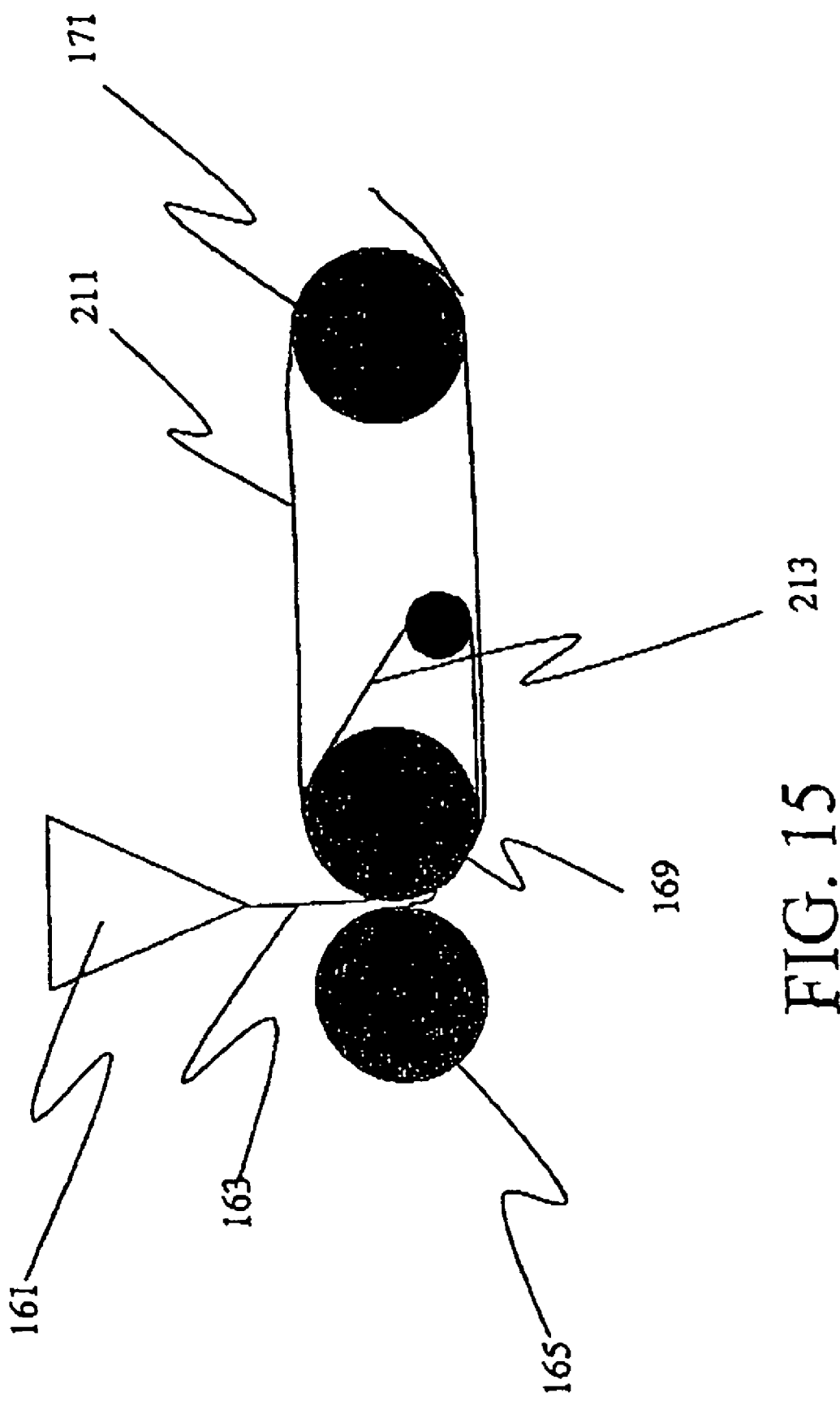
FIG. 15 is a schematic view of an extrusion roll molding system with a compliant belt system comprising a metal belt and an elastomeric belt where the metal belt and the elastomeric belt surround different belt rollers, in accordance with example embodiments of the present invention.

In example embodiments illustrated in example FIG. 15, a metal belt 211 may be used in conjunction with an elastomeric belt 213 at the nip between belt roller 169 and pattern roller 165. The combination of elastomeric belt 213 and metal belt 211 may be ideal for producing the adequate compliancy and smoothness on the compliant side of the nip. This configuration may be beneficial so that the elastomeric layer and the metal layer can expand at different rates and different percentages when heated or cooled. Heating or cooling can also be added to only one or the other of the metal or elastomeric layers. The elastomeric layer can also be used to drive the metal layer.

Figure 16:
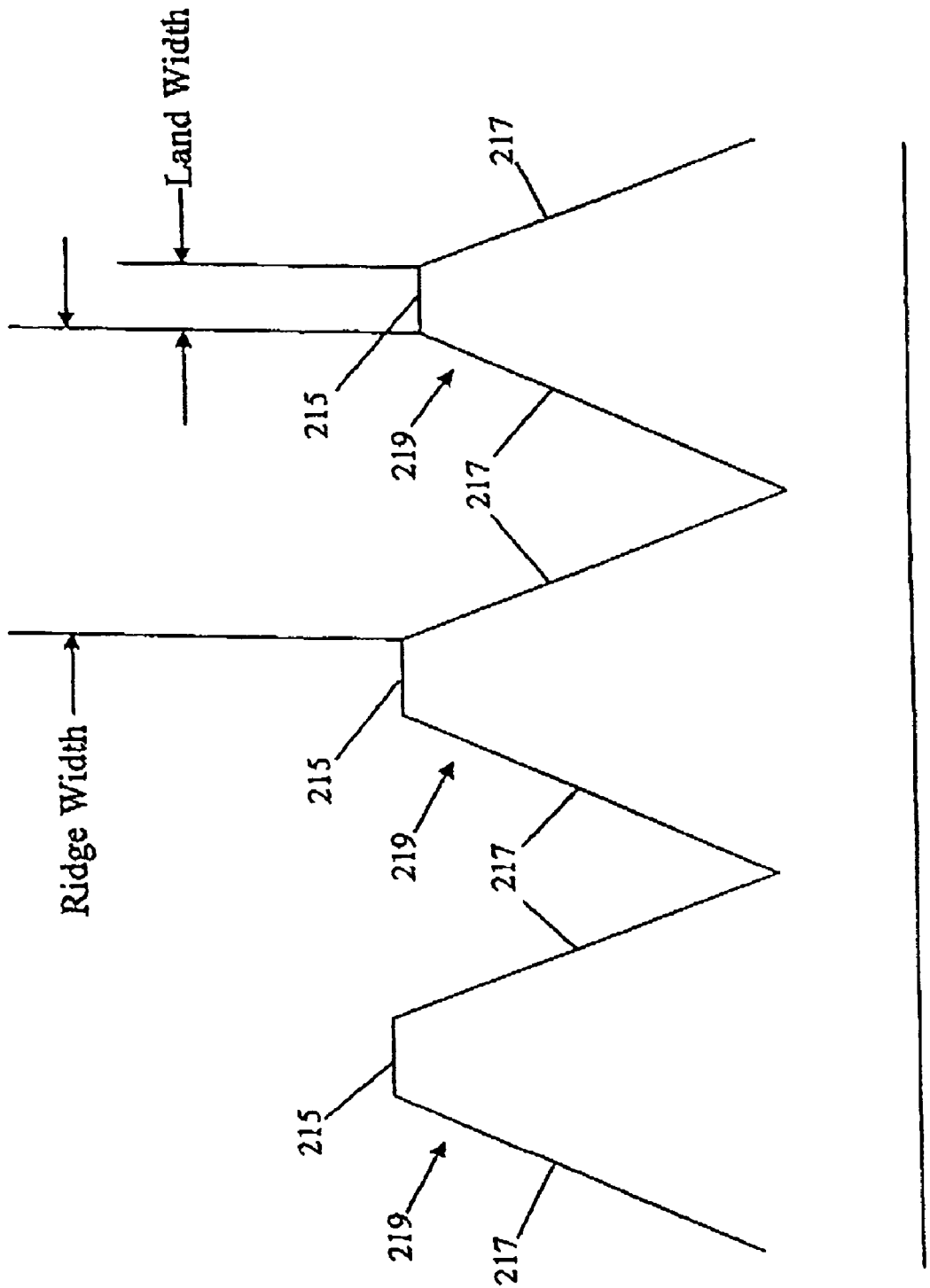
FIG. 16 is a view of a portion of a light management film, illustrating lands and ridges, in accordance with example embodiments of the present invention.

FIG. 16 is a view of a portion of a light management film, illustrating lands and ridges, in accordance with example embodiments of the present invention. Each optical element 219 includes a land 215 and ridges 217. Ridges 217 and the surfaces that form them provide optical power and serve to to redirect light. Conversely, the lands 215 add no optical power to the system and do not redirect light. Accordingly, a light management film wherein significant redirection of light is needed would have no lands 215 and have only ridges 217. However, due to manufacturing tolerances, it may be impractical (e.g. to expensive) to use a manufacturing process and material that would produce very small lands. Accordingly, for a light management film, the ratio of the lands 215 in relation to the ridges 217 needs to be better than a predetermined level.

In example embodiments, lands 215 are less than 5 micrometers in width. In example embodiments, lands 215 are less than 3 micrometers in width. In example embodiments, the lands 215 are less than 1 micrometer in width. In example embodiments, the total surface of the lands of a solid film is less than approximately 20 percent of the surface area of the light management film, while the total surface area of the ridges on the solid film is greater than 80 percent of the surface area of the solid film. In example embodiments, the total surface area of the lands of a solid film is less than approximately 6.66 percent of the surface area of the solid film, while the total surface area of the ridges on the solid film is greater than approximately 93.33 percent of the surface area of the solid film. In example embodiments, the total surface area of the lands of the solid film is less than approximately 3.33 percent of the surface area of the solid film, while the total surface area of the ridges of the solid film is greater than approximately 96.67 percent of the surface area of the solid film. One of ordinary skill in the art would appreciate that surface area of the ridges is the amount of the optically active area that is parallel to a solid film.

One of ordinary skill in the art would appreciate that in order to reduce the land area of a light management film, a careful choice of materials and manufacturing processes is required. Further, while reducing the area of the lands 215, a smooth surface 221 is also maintained on the opposite side of the film. Additionally, considerations must be made to maintain uniform thickness of the film.

The metal layer of a belt of the belt system should be thin enough to provide sufficient flexibility to accommodate any thickness non-uniformities in the melt curtain. Preferably, the metal layer has a thickness between 50 and 2000 micrometers. Below 35 micrometers, the metal layer may become delicate, leading to shorter lifetimes in production. When the metal layer is 2500 micrometers thick or greater, it may become less flexible and maintaining even pressure across the nip may become difficult. Preferred materials for the metal layer include stainless steel, nickel, high phosphorus nickel, chrome, an alloy, or any other suitable metal. The sleeve is preferably seamless to prevent any imperfections to the backside surface of the film being reproduced onto the film.

The elastomeric layer of a belt may include a polymeric material. The elastomeric layer may provide a compliant surface that enables a relatively uniform nip pressure despite thickness variations across the width of the melt curtain. The elastomeric layer should be between 3 millimeters and 20 millimeters in order to provide the proper resiliency without sacrificing its heat transfer properties. The covering may be made out silicone rubber, neoprene rubber, EPDM, Viton, Hypalon, polyurethane or any other material with suitable hardness and durability. However, one of ordinary skill in the art can appreciate other materials.

The belt system may have durability to survive the high temperatures and high nip pressures found in extrusion casting nips. The sleeve may be capable of being polished to an optical finish and may have adequate release properties to the material being extruded. The sleeve may resist the build-up of residue related to the extrusion of plastics at high temperatures and may also be easily cleaned when an unacceptable level of residue is deposited on its surface. It may be preferred to have device for cleaning the surface of this roller during production.

The following examples illustrate the practice of this invention. They are not intended to be exhaustive of all possible variations of the invention. Parts and percentages are by weight unless otherwise indicated. The invention has been described in detail with particular reference to certain preferred embodiments thereof, but it will be understood that variations and modifications can be effected within the spirit and scope of the invention.

PARTS LIST

1; Light management film system
2; Light management film
5; Optical elements
6; Light exit surface
7; Light entrance surface
25; Optical coating
26; Light source
30; Optical diffuser layers
40; Back reflector
101; Belt system with a metal and an elastomeric layer
103; Belt roller
105; Belt roller
107; Elastomeric layer
109; Metal layer
111; Belt system with two metal layers and two elastomeric layers
113; Belt roller
115; Belt roller
117; Outer metal layer
119; Outer elastomeric layer
121; Inner elastomeric layer
123; Inner metal layer
131; Belt roller
133; Belt roller
135; Metal layer
137; Elastomeric layer with reinforcing fibers substantially oriented in one direction
141; Belt system with timing protuberances
143; Belt
145; Timing protuberances
151; Belt with three-dimensional pattern
153; Three-dimensional pattern
161; Extrusion die
163; Molten polymer
165; Patterned roller
167; Belt
169; Belt roller
171; Belt roller
181; Reciprocating soft lint-free woven cleaner
191; Polishing roll
201; Electrostatic discharge system
211; Metal belt
213; Elastomeric belt
215; Lands
217; Ridges
219; Optical elements
BL; Backlight
D; Display
R; Rays

The invention claimed is:

1. A compliant pressure belt comprising an endless belt comprising at least one elastomeric layer and one metal layer, wherein the outside surface of said belt has a roughness average less than 50 nanometers and a hardness between 90 Shore A and 50 Shore D, wherein said at least one elastomeric layer comprises a first elastomeric layer and a second elastomeric layer; said first elastomeric layer and said second elastomeric layer differ in hardness; and said first elastomeric layer is toward the inside of the belt in relation to the second elastomeric layer.

2. The compliant pressure belt of claim 1, wherein said at least one metal layer is on the outside of said belt.

3. The compliant pressure belt of claim 2, comprising a metal layer on the inside of said belt.

4. The compliant pressure belt of claim 1, wherein the first elastomeric layer has a greater hardness than the second elastomeric layer.

5. The compliant pressure belt of claim 1, wherein the second elastomeric layer has a greater hardness than the first elastomeric layer.

6. The compliant pressure belt of claim 1 wherein said at least one elastomeric layer comprises nanoclay particles in an amount of between 0.2 and 5 weight percentage in the layer having particles present.

7. The compliant pressure belt of claim 1, wherein said belt has a circumference between 0.75 and 10 meters and a width between 0.5 and 2 meters.

8. The compliant pressure belt of claim 1, wherein said at least one elastomeric layer is on the outside of said belt and said at least one elastomeric layer comprises between 1 and 10 percentage by weight of a polymer having a surface energy between 22 and 35 dynes per square centimeter.

9. The compliant pressure belt of claim 1, wherein said belt is provided with timing protuberances on the inside of said belt.

10. The compliant pressure belt of claim 1, wherein said metal layer is provided with a three-dimensional pattern.

11. A compliant pressure belt comprising an endless belt comprising at least one elastomeric layer and one metal layer, wherein the outside surface of said belt has a roughness average less than 50 nanometers and a hardness between 90 Shore A and 50 Shore D, wherein said at least one elastomeric layer comprises reinforcing fibers substantially oriented in one direction.

\* \* \* \* \*